US008812743B2

(12) United States Patent
Tsunoda (10) Patent No.: US 8,812,743 B2
(45) Date of Patent: *Aug. 19, 2014

(54) IMAGE CAPTURING TRANSFER APPARATUS THAT SENDS A FLASH ON/OFF PARAMETER INSTRUCTION FOR A FLASH UNIT CONNECTED TO THE IMAGE CAPTURING APPARATUS

(75) Inventor: Masayoshi Tsunoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,994

(22) Filed: Sep. 6, 2012

(65) Prior Publication Data
US 2012/0327253 A1    Dec. 27, 2012

Related U.S. Application Data

(63) Continuation of application No. 12/856,464, filed on Aug. 13, 2010, now Pat. No. 8,266,332.

(30) Foreign Application Priority Data

Aug. 20, 2009    (JP) ................................ 2009-191193

(51) Int. Cl.
G06F 13/10    (2006.01)
G06F 1/26    (2006.01)

(52) U.S. Cl.
USPC ............ 710/5; 710/8; 710/9; 710/10; 396/56; 396/57; 348/221.1; 348/333.02

(58) Field of Classification Search
USPC ..................... 710/5, 8–10; 348/222.1, 333.02; 396/56, 57

See application file for complete search history.

(56) References Cited

U.S. PATENT DOCUMENTS

| 7,885,533 | B2 | 2/2011 | Clark |
| 8,116,620 | B2 | 2/2012 | King |
| 8,149,286 | B2 | 4/2012 | Takagi et al. |

(Continued)

FOREIGN PATENT DOCUMENTS

| JP | 11-134265 A | 5/1999 |
| JP | 2002-350979 A | 12/2002 |
| JP | 2005-136833 A | 5/2005 |

OTHER PUBLICATIONS

Japanese Office Action issued on Jul. 30, 2013 in corresponding application No. 2009-191193.

(Continued)

*Primary Examiner* — Tammara Peyton
(74) *Attorney, Agent, or Firm* — Carter, DeLuca, Farrell & Schmidt, LLP (57) ABSTRACT

An information processing apparatus that can communicate with an external apparatus includes an instruction unit configured to receive an instruction to change a parameter in the external apparatus, and a sending unit configured to send a control signal for causing the external apparatus to change the parameter in the external apparatus, to the external apparatus according to the instruction received by the instruction unit, in which the sending unit sends, when the instruction received by the instruction unit includes an instruction to change a plurality of types of parameters in the external apparatus, the control signal a plural number of times according to the types of the parameters to be changed, to cause the external apparatus to change the parameters in a predetermined order.

20 Claims, 7 Drawing Sheets

(56) References Cited

U.S. PATENT DOCUMENTS

8,224,170 B2 * 7/2012 King et al. .................. 396/56
8,253,837 B2 * 8/2012 Ono ...................... 348/333.02
2008/0198239 A1 8/2008 Ono

OTHER PUBLICATIONS

Japanese Office Action issued on Nov. 5, 2013 in corresponding application No. 2009-191193.

* cited by examiner

IMAGE CAPTURING TRANSFER APPARATUS THAT SENDS A FLASH ON/OFF PARAMETER INSTRUCTION FOR A FLASH UNIT CONNECTED TO THE IMAGE CAPTURING APPARATUS

CROSS REFERENCE TO RELATED APPLICATIONS

This application is a continuation of U.S. Pat. No. 8,266,332 filed Aug. 13, 2010, which claims the benefit of and priority to Japanese Patent Application No. 2009-191193 filed Aug. 20, 2009, the entire contents of each of which are hereby incorporated by reference herein in their entirety.

BACKGROUND OF THE INVENTION

1. Field of the Invention

The present invention relates to an information processing apparatus that can communicate with an external apparatus, and a technique for setting a parameter in the external apparatus.

2. Description of the Related Art

In recent years, an information processing apparatus has been able to set a parameter in an external apparatus by communicating with the external apparatus. Particularly when complicated setting is performed for an external apparatus having only a limited operation unit, for example, a mobile device, an information processing apparatus having various interfaces such as a personal computer (PC) may perform setting more simply than when the external apparatus performs setting. In this case, the information processing apparatus sends a parameter to be changed and its value to the external apparatus, to change the parameter in the external apparatus (see Japanese Patent Application Laid-Open No. 2005-136833).

In order to change the parameter in the external apparatus, however, every time a user gives an instruction to change the parameter, a command to change the parameter is to be sent. If there is a plurality of parameters, when one of the parameters is changed, the other parameters may be affected. Therefore, it is difficult to change the parameters collectively.

SUMMARY OF THE INVENTION

According to an aspect of the present invention, there is provided an information processing apparatus that can communicate with an external apparatus, including an instruction unit configured to receive an instruction to change a parameter in the external apparatus, and a sending unit configured to send a control signal for causing the external apparatus to change the parameter in the external apparatus, to the external apparatus according to the instruction received by the instruction unit, in which the sending unit sends, when the instruction received by the instruction unit includes an instruction to change a plurality of types of parameters in the external apparatus, the control signal a plural number of times according to the types of the parameters to be changed, to cause the external apparatus to change the parameters in a predetermined order.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

(Configuration of PC)

Figure 1A:
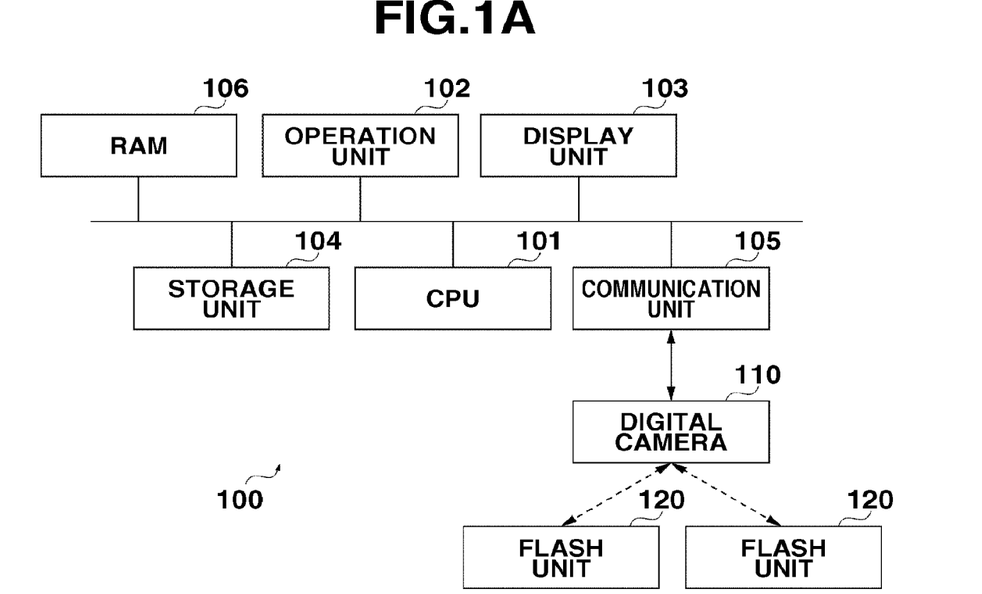
FIG. 1A illustrates a hardware configuration of a system and an information processing apparatus according to a first exemplary embodiment.

FIG. 1A is a block diagram illustrating a PC 100 as an example of an information processing apparatus according to a first exemplary embodiment, and an image capturing apparatus 110 as an example of an image processing apparatus that communicates with the PC 100.

The PC 100 includes a central processing unit (CPU) 101, an operation unit 102, a display unit 103, a storage unit 104, a communication unit 105, and a random access memory (RAM) 106.

The CPU 101 performs various calculations and controls the whole PC 100 according to a signal or a program input thereto. The operation unit 102 is a device for receiving an operation input into the PC 100, and includes a mouse and a keyboard. The display unit 103 is a display for displaying various types of information. The display unit 103 need not necessarily be integral with the PC 100. The PC 100 may at least control display on the display unit 103. The RAM 106 is a nonvolatile memory storing temporary data, and is used for the work by the CPU 101. The storage unit 104 is a nonvolatile memory storing various types of data, e.g., contents such as image data, and programs and parameters used for various types of control. The PC 100 includes an access unit for accessing the storage unit 104, and may read and write data out of and into the storage unit 104. The storage unit 104 itself may be an external device of the PC 100.

The communication unit 105 communicates with the image capturing apparatus 110, and sends and receives data and a control signal to and from the image capturing apparatus 110. A protocol for establishing connection to communicate data includes a picture transfer protocol (PTP). The communication unit 105 may perform communication by wired connection such as a universal serial bus (USB) cable. The communication unit 105 may perform communication by wireless connection such as a wireless local area network (LAN). Alternatively, the communication unit 105 may be directly connected to an external apparatus, or may be connected to an external apparatus via a server or a network such as the Internet. Connectable external apparatuses include a digital audio player and an external storage.

(Configuration of Image Capturing Apparatus)

Figure 1B:
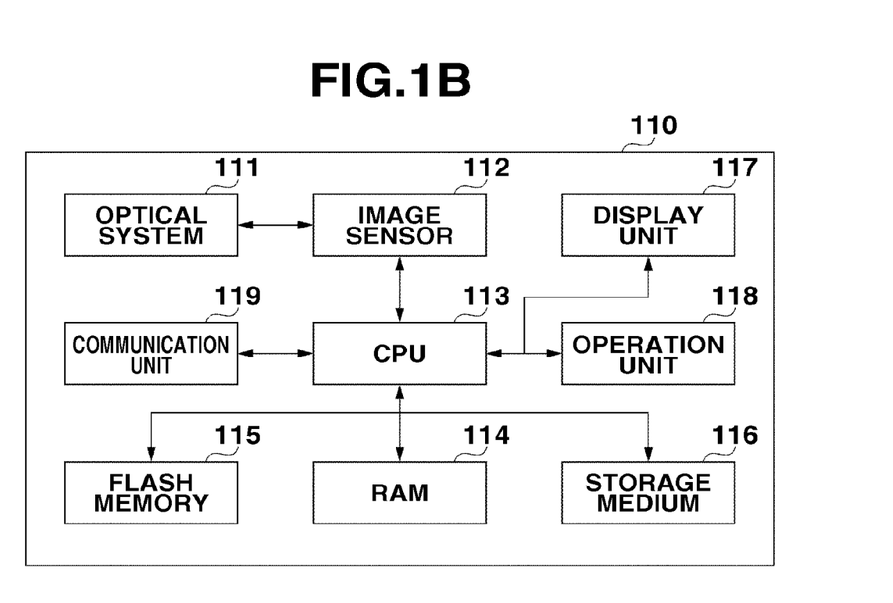
FIG. 1B illustrates a hardware configuration of a digital camera according to the first exemplary embodiment.

A configuration of the image capturing apparatus 110 will be described below. FIG. 1B is a block diagram illustrating the configuration of the image capturing apparatus 110. The image capturing apparatus 110 includes an apparatus for image-capturing an object to obtain image data, such as a digital camera, and can communicate with the PC 100. In the present exemplary embodiment, the digital camera is taken as an example.

The digital camera 110 includes an optical system 111, an image sensor 112, a central processing unit (CPU) 113, a RAM 114, a flash memory 115, a storage medium 116, a display unit 117, an operation unit 118, and a communication unit 119.

The optical system 111 includes a lens, a shutter, and a diaphragm, and focuses light from the object onto the image sensor 112 in suitable amount and at suitable timing. The image sensor 112 converts the light focused via the optical system 111 into an image. The CPU 113 controls various types of calculations and various units constituting the digital camera 110 according to a signal and a program input thereto. The RAM 114 is a nonvolatile memory storing temporary data, and is used for the work by the CPU 113. The flash memory 115 is a nonvolatile memory storing a program (firmware) for controlling the digital camera 110 and various types of setting information.

The storage medium 116 stores data representing a captured image, or the like. The storage medium 116 can be removed after the image capturing, and can be mounted on the PC 100 to read out data. More specifically, the digital camera 110 includes an access unit for accessing the storage medium 116 so that the data may be read and written out of and into the storage medium 116.

The display unit 117 displays a view finder image during the image capturing, a captured image, and characters for a dialogue operation. The digital camera 110 need not include the display unit 117. The digital camera 110 may have a display control function for controlling the display on the display unit 117. The operation unit 118 accepts a user's operation. The operation unit 118 includes a button, a lever, and a touch panel, for example. The communication unit 119 is connected to an external apparatus, and sends and receives a control command and data to and from the external apparatus. As illustrated in FIG. 1, the digital camera 110 can connect one or a plurality of external flash units 120 by wire or wireless. The digital camera 110 may contain the flash unit 120.

(Setting Data)

In the present exemplary embodiment, the PC 100 sets parameters in the flash unit 120 for the digital camera 110. The function of the flash unit 120, which can be set by a user, includes image capturing conditions such as flash ON/OFF, a light control mode, a light control correction amount, and a flash amount. When the digital camera 110 and the flash unit 120 are connected to each other by wireless, the function of the flash unit 120 includes a wireless function, a wireless flash light control correction amount, and a wireless flash amount.

Figure 2A:
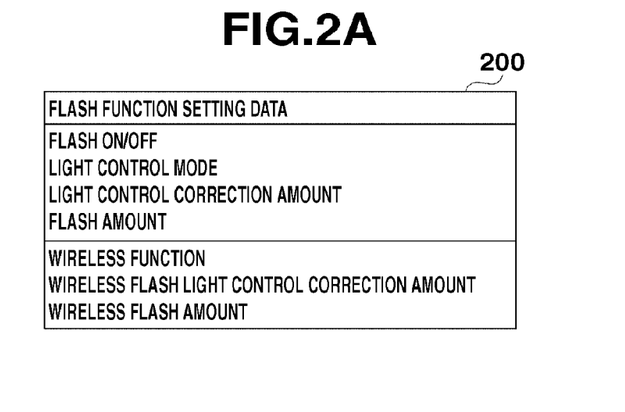
FIG. 2A illustrates setting data according to the first exemplary embodiment.

FIG. 2A illustrates setting data 200 including items relating to the function of the flash unit 120 and their parameters. In the present exemplary embodiment, one data structure can include a plurality of items and their parameters. The PC 100 sends the setting data 200 to the digital camera 110. The digital camera 110 receives and reads the setting data 200, to change the parameters in the flash unit 120. More specifically, the PC 100 can control the digital camera 110 away from the camera to change setting of the flash unit 120 using the setting data 200.

A subordinate relationship, as described below, exists among items/parameters included in the setting data 200 according to their types. The subordinate relationship among items/parameters means that if a parameter of a first item is affected by a variation of a parameter of a second item, e.g., change of the parameter, the parameter of the first item is subordinate to the parameter of the second item.

Figure 2B:
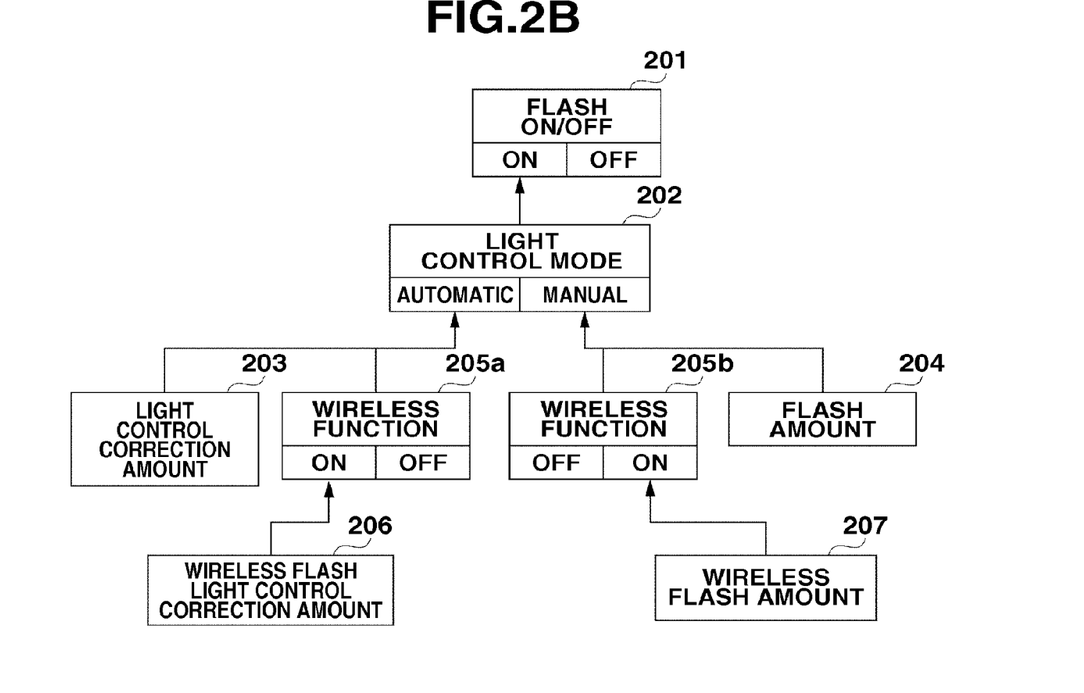
FIG. 2B illustrates a subordinate relationship according to the first exemplary embodiment.

FIG. 2B illustrates a subordinate relationship between items. A subordinating parameter and a parameter to be subordinated are respectively referred to as a higher-order parameter and a lower-order parameter. An arrow illustrated in FIG. 2B is drawn from a lower-order parameter to a higher-order parameter. For example, an item 206 is subordinate to an item 205a, the item 205a is subordinate to an item 202, and the item 202 is subordinate to an item 201. The subordinate relationships are previously held in the storage unit 104 illustrated in FIG. 1A.

The contents of FIG. 2B will be specifically described. First, the highest-order item is flash ON/OFF setting 201. If a parameter of the flash ON/OFF setting 201 is "flash OFF", no subordinate parameter can be set. If the parameter is "flash ON", light control mode setting 202 is subordinate to the parameter. A settable parameter of the light control mode setting 202 includes "automatic" and "manual".

If the parameter of the light control mode setting 202 is "automatic", a settable item subordinate to the parameter includes light control correction amount setting 203 and wireless function ON/OFF setting 205a. If a parameter of the wireless function ON/OFF setting 205a is "OFF", no subordinate parameter can be set. If the parameter is "ON", a settable item subordinate to the parameter includes wireless flash light control correction amount setting 206.

If the parameter of the light control mode setting 202 is "manual", a settable item subordinate to the parameter includes flash amount setting 204 and wireless function ON/OFF setting 205b. If a parameter of the wireless function ON/OFF setting 205b is "OFF", no subordinate parameter can be set. If the parameter is "ON", a settable item subordinate to the parameter includes wireless flash amount setting 206.

Although in the present exemplary embodiment, the flash function setting data 200 is taken as an example of the parameters, other parameters having a subordinate relationship exist, to which an exemplary embodiment as described below, can be applied. The parameters include basic image capturing conditions such as an image capturing mode, a photometric mode, a shutter speed, a diaphragm value, and an International Standardization Organization (ISO) value and development parameters such as sharpness, color tone, color strength, and contrast.

(Parameter Setting Processing)

Specific operations performed when the PC 100 sets the parameters in the flash unit 120 for the digital camera 100 will be described below. In the present exemplary embodiment, the PC 100 receives and stores setting data representing current setting from a digital camera 110, and then returns its value when the digital camera 110 is connected thereto again. Thus, optimum flash setting for the user can be stored as setting data in the PC 100 and reflected again on the digital camera 110 from the PC 100, as needed, at a future date. Therefore, time and labor are saved for the user when finely adjusting the parameters to obtain optimum setting in image capturing.

Processes performed by the PC 100 in a flowchart, as described below, are implemented when the CPU 101 controls the units in the PC 100 according to a program. Processes performed by the digital camera 110 are implemented when the CPU 113 controls the units in the digital camera 110 according to a program.

(Setting Data Receiving Processing)

Figure 3:
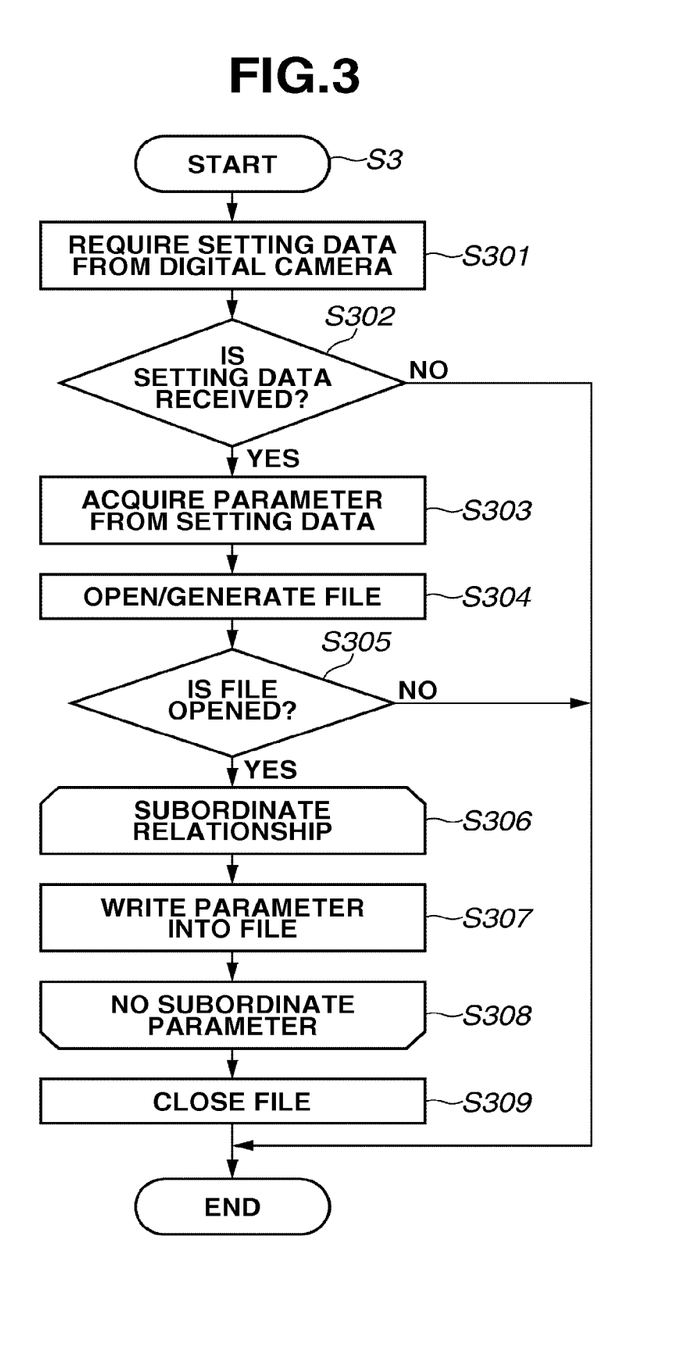
FIG. 3 is a flowchart illustrating processing according to the first exemplary embodiment.

FIG. 3 is a flowchart illustrating processing for the PC 100 to receive the setting data 200 from the digital camera 110 and store the received setting data 200 in the storage unit 104. The flowchart is started when the PC 100 starts a particular application and performs a predetermined menu operation.

In step S301, the PC 100 first requests the setting data 200 from the digital camera 110. The digital camera 110 generates, when it receives the request, the setting data 200 based on its own setting stored in the flash memory 115, and sends the generated setting data 200 to the PC 100.

In step S302, the PC 100 determines whether it has received the setting data 200 from the digital camera 110. If the PC 100 has received the setting data 200 (YES in step S302), the processing proceeds to step S303. If the PC 100 has not received the setting data (NO in step S302), the processing ends.

In step S303, the PC 100 refers to the setting data 200, acquires each setting parameter, and stores the acquired setting parameter once in the RAM 106. In the present exemplary embodiment, the PC 100 stores the setting data 200 in the form of a file. The setting data 200 is made a setting file because it makes it easy to handle the data, e.g., in a case of transfer.

In step S304, the PC 100 refers to the storage unit 104, and determines whether a setting file for storing setting items has already existed. If the setting file has existed, it is opened for writing. If the setting file has not existed, a file is newly generated and opened for writing.

In step S305, the PC 100 determines whether the file has been opened. If the file has been opened (YES in step S305), the processing proceeds to step S306. If the file has not been opened (NO in step S305), the processing ends.

In steps S306 to S308, the PC 100 searches the setting data 200 for parameters in descending order of subordinate relationships from the highest-order parameter illustrated in FIG. 2B. If a parameter has been found, the parameter is written into the setting file, and parameters subordinate to the parameter are then searched for. The parameters are thus searched for in descending order until there is no settable subordinate parameter, so that only the parameters required for each mode are stored.

If a parameter of the flash ON/OFF setting 201 is "flash OFF", for example, parameters subordinate to the parameter need not to be set, and are not thus written into the setting file. If the parameter is "flash ON" and a parameter of the light control mode setting 202 subordinate to the parameter is "automatic", the light control correction amount setting 203 is written into the setting file. More specifically, if there is a subordinate parameter, the subordinate parameter is written into the setting file. If there is no subordinate parameter, the writing into the setting file is terminated.

In step S309, the PC 100 finally closes the setting file and stores the closed setting file in the storage unit 104. The parameters are stored in the setting file in such a procedure so that unnecessary items and parameters are prevented from being stored in the setting file. Therefore, a file capacity can be suppressed.

Since in the present exemplary embodiment, a setting file has already existed, the setting file is updated. However, a plurality of setting files may be generated. In such a case, even when the digital camera 110 is connected to a plurality of flash units, for example, a setting file can be prepared for each of the flash units and an optimum parameter can be described in the setting file.

(Setting Data Transmission Processing)

Figure 4:
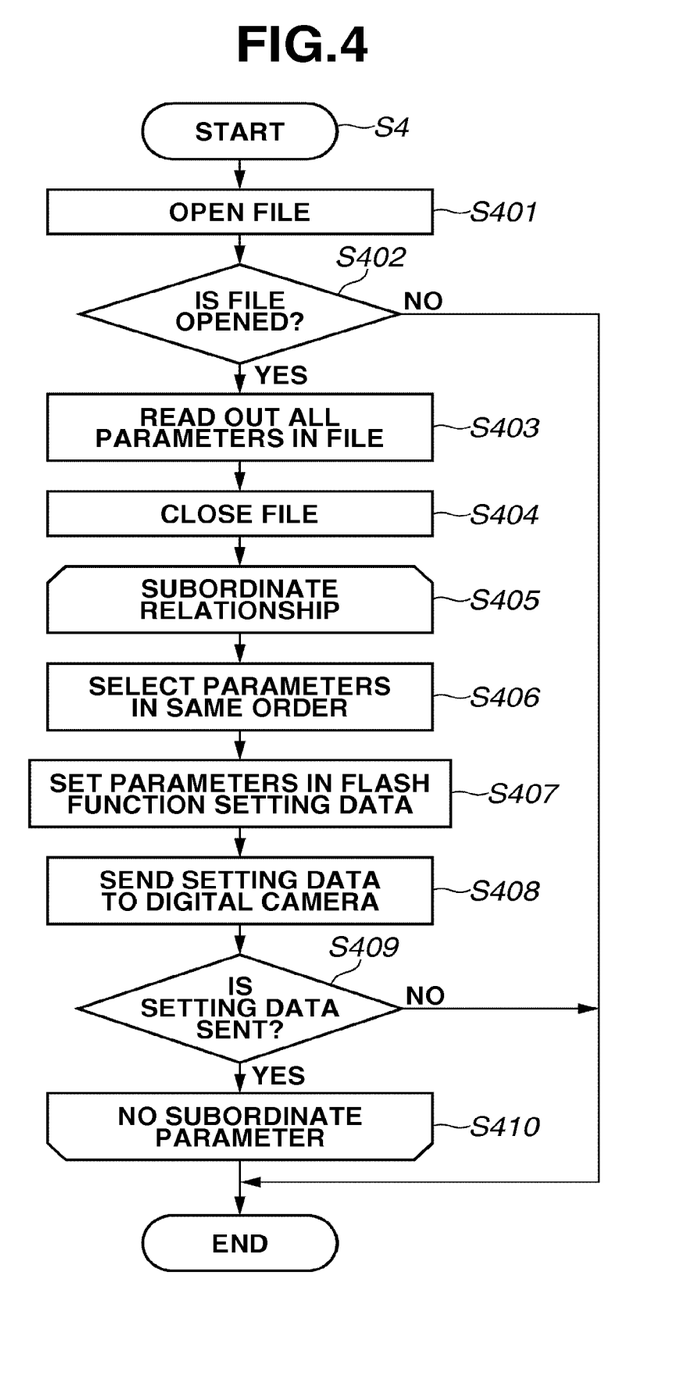
FIG. 4 is a flowchart illustrating processing according to the first exemplary embodiment.

FIG. 4 is a flowchart illustrating processing for setting the parameters described in the setting file stored in FIG. 3 to the digital camera 110. The flowchart is started when the PC 100 starts a particular application, selects a setting file by a predetermined menu operation such as a user operation, and issues an instruction to execute the setting file.

In step S401, the PC 100 opens the setting file stored in the storage unit 104. In step S402, the PC 100 determines whether the setting file has been opened. If the setting file has been opened (YES in step S402), the processing proceeds to step S403. If the setting file has not been opened (NO in step S402), the processing ends.

In step S403, the PC 100 reads out parameters of all items described in the setting file, and stores the parameters in the RAM 106. In step S404, the PC 100 closes the setting file.

In step S405, the PC 100 uses a parameter subordinate to a parameter being currently processed, as a processing object. If the processing first proceeds to step S405, the highest-order parameter is used as a processing object.

In step S406, the PC 100 selects, out of the parameters stored in the RAM 106, all the parameters that are in the same order of subordinate relationships as the parameter being currently processed. For example, the light control correction amount setting 203 and the wireless function ON/OFF setting 205a illustrated in FIG. 2B are in the same order because they are directly subordinate to the light control mode setting 202 (automatic). The flash amount setting 204 and the wireless function ON/OFF setting 205b are also in the same order.

In step S407, the PC 100 generates as the setting data 200, flash function setting data 200 including all the parameters selected in step S406.

In step S408, the PC 100 sends the generated setting data 200 to the digital camera 110. In step S409, the PC 100 determines whether it has succeeded in sending the setting data 200 to the digital camera 110 based on a response from the digital camera 110. If the PC 100 has succeeded in sending the setting data 200 (YES in step S409), the processing proceeds to step S410. If the PC 100 has failed in sending the setting data 200 (NO in step S409), the processing ends.

In step S410, the PC 100 determines whether there is no parameter subordinate to the parameter being currently processed. If the subordinate parameter exists (NO in step S410), the processing returns to step S405. In step S405, a parameter subordinate to the subordinate parameter is used as a processing object. If there is no subordinate parameter (YES in step S410), the processing ends.

By the processing illustrated in FIG. 4, the PC 100 sends the setting data 200 a plurality of times when a plurality of types of parameters are processed, in descending order from the highest-order parameter. Thus, the digital camera 110 reflects, every time it receives the setting data 200, its contents on the flash unit 120. Therefore, the contents of the setting data 200 are reflected on the flash unit 120 in a suitable descending order from the highest to the lowest.

If there is a plurality of parameters in the same order of subordinate relationships, the parameters can be included in one setting data 200 when they are sent, so that a communication amount and a communication load can be reduced without disturbing the subordinate relationships.

(Parameter Setting Screen)

In a second exemplary embodiment, a screen for changing setting of a digital camera 110 is displayed on a display unit 103 in a PC 100, and a user gives an instruction to perform setting using an operation unit 102 in the PC 100. The present exemplary embodiment includes many units similar to those in the first exemplary embodiment and hence, the description thereof is not repeated.

Figure 7:
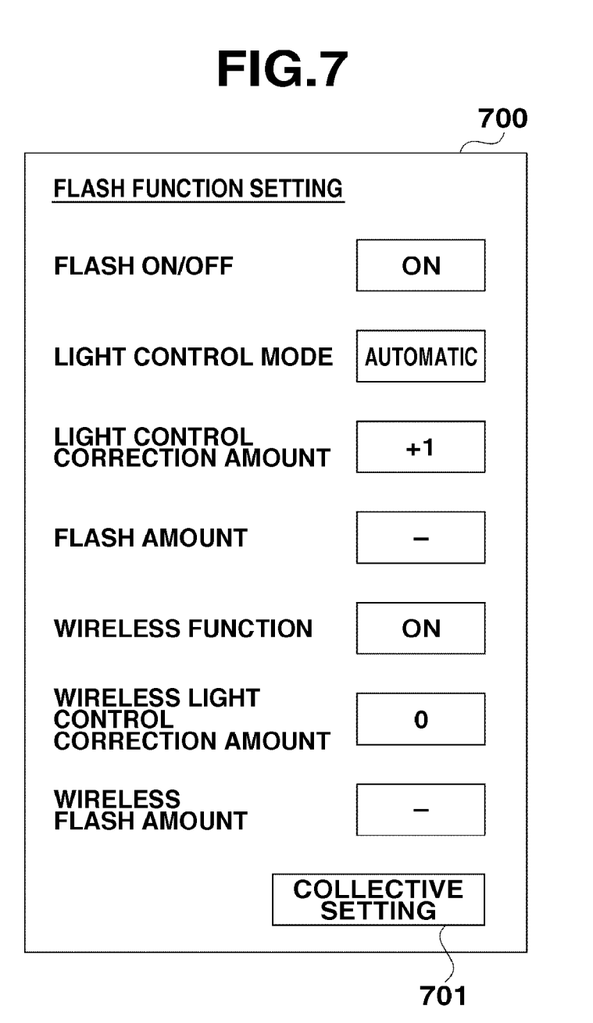
FIG. 7 illustrates a setting screen according to the second exemplary embodiment.

The PC 100 displays on the display unit 103 a setting screen illustrated in FIG. 7 for setting parameters in a flash unit 120 according to an operation in the operation unit 102. On a setting screen 700, items relating to the function of the flash unit 120 and boxes in which parameters of the items are respectively input are displayed. A parameter of an item may not be changed depending on setting of the flash unit 120. In this case, the PC 100 performs display for informing the user that a parameter cannot be set by displaying "-" in the corresponding box or by graying-out the box. If a parameter of flash ON/OFF setting is "OFF", for example, "-" is displayed on all the boxes other than the corresponding box.

A collective setting button 701 is provided on the setting screen 700. The collective setting button 701 is used to collectively set in the flash unit 120 a plurality of parameters, which has been changed by a user's operation. More specifically, the user can input desired parameters in one or a plurality of boxes by operating the operation unit 102, and then give an instruction to collectively change the parameters for a plurality of items by selecting the collective setting button 701.

(Parameter Setting Processing)

Specific operations performed when the PC 100 sets parameters in the flash unit 120 for the digital camera 110 will be described below. In the present exemplary embodiment, the PC 100 first receives setting data representing current setting from a certain digital camera, and displays the received setting data as an initial value of the parameter on the setting screen 700.

(Setting Data Receiving Processing)

Figure 5:
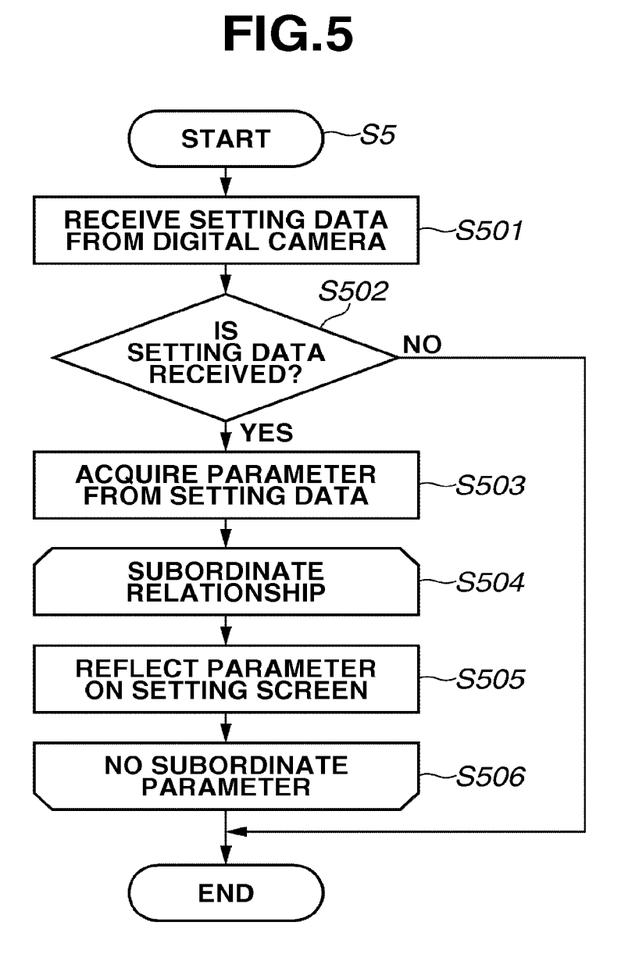
FIG. 5 is a flowchart illustrating processing according to a second exemplary embodiment.

FIG. 5 is a flowchart illustrating processing for the PC 100 to receive setting data 200 from the digital camera 110 and display the received setting data 200 on the setting screen 700.

Steps S501 to S503 are similar to steps S301 to S303 illustrated in FIG. 3 and hence, the description thereof is not repeated.

In steps S504 to S506, the PC 100 searches the setting data 200 for parameters in descending order of subordinate relationships from the highest-order parameter illustrated in FIG. 2. If a parameter has been found, the parameter is displayed on the setting screen 700, and parameters subordinate to the parameter are searched for. The parameters are searched for in descending order until there is no settable subordinate parameter, so as to display the parameters required for each mode. "-" is displayed for an item having no settable parameter and the processing is terminated.

(Setting Data Transmission Processing)

Figure 6:
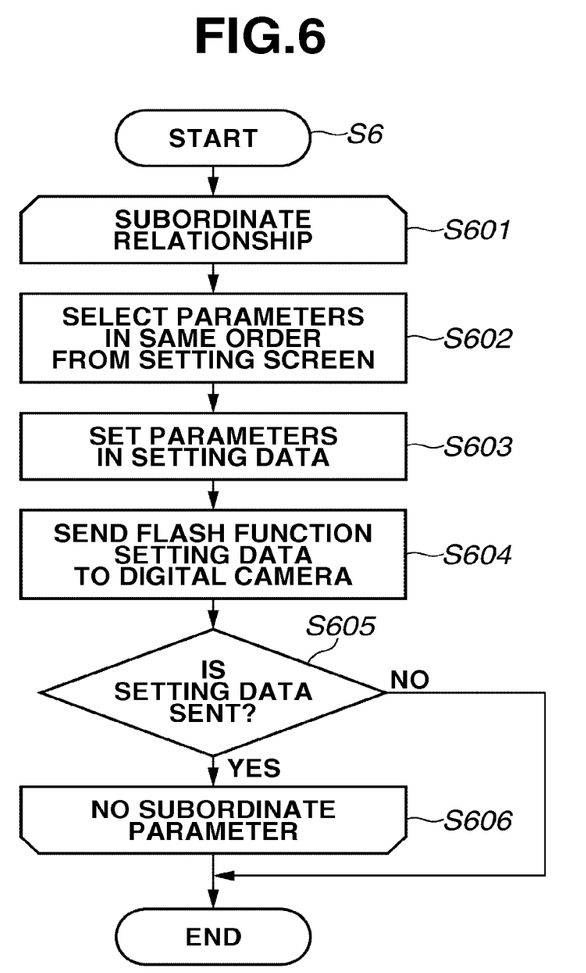
FIG. 6 is a flowchart illustrating processing according to the second exemplary embodiment.

FIG. 6 is a flowchart illustrating processing for setting parameters displayed on the setting screen 700 in the digital camera 110. The flowchart is started when the collective setting button 701 is pressed by a user's operation.

Processes in the flowchart are different from the process in FIG. 4, in that a parameter currently displayed on the setting screen 700 is acquired and the acquired parameter is sent to the digital camera 110 instead of reading out a parameter from a setting file. Other processes are similar to those in steps S405 to S410 illustrated in FIG. 4 in that parameters are sent in descending order from the highest-order parameter, for example, and hence, the description thereof is not repeated.

By the above-mentioned procedure, the PC 100 can collectively change the parameters in the flash unit 120.

Other Embodiments

The present invention is also implemented by executing processing, as described below. More specifically, software (a program) for implementing the function of the above-mentioned exemplary embodiment is supplied to a system or an apparatus via a network or various types of non-transitory storage media, and a computer (or a CPU, a microprocessing unit (MPU), etc.) in the system or the apparatus reads out and executes the program. In this case, hardware such as a processor which reads the program functions as a unit for performing various types of control.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

What is claimed is:

1. An information processing apparatus that can communicate with an external apparatus, comprising:

an input unit configured to input an instruction to change a parameter of the external apparatus;

a sending unit configured to, in a case where the instruction input by the input unit is an instruction to change a plurality of types of parameters of the external apparatus, send a plurality of control signals for changing the plurality of types of parameters of the external apparatus to the external apparatus based on the plurality of types of the parameters to be changed; and a control unit configured to, in a case where the instruction input by the input unit is an instruction to change the plurality of types of parameters of the external apparatus, control a sending order of the plurality of control signals, wherein, among the plurality of types of parameters which are in a subordinate relationship, the control unit performs control to send a control signal for changing a parameter having a higher order in the subordinate relationship prior to a control signal for changing a parameter having a lower order in the subordinate relationship.

2. The information processing apparatus according to claim 1, wherein the external apparatus is an image capturing apparatus, and the plurality of types of parameters include a condition for image capturing performed by the image capturing apparatus.

3. The information processing apparatus according to claim 2, wherein the condition includes parameters of a flash apparatus connected to the image capturing apparatus.

4. The information processing apparatus according to claim 3, wherein, among the parameters of the flash apparatus, a parameter indicating ON and OFF of a flash function has a higher order in the subordinate relationship than a parameter indicating whether light control is performed manually.

5. The information processing apparatus according to claim 3, wherein, among the parameters of the flash apparatus, a parameter indicating ON and OFF of a flash function has a higher order in the subordinate relationship than a parameter indicating ON and OFF of a wireless function.

6. The information processing apparatus according to claim 3, wherein, among the parameters of the flash apparatus, a parameter indicating ON and OFF of a flash function has a higher order in the subordinate relationship than a parameter indicating a light amount.

7. The information processing apparatus according to claim 1, further comprising:

a receiving unit configured to receive a plurality of types of parameters of the external apparatus from the external apparatus; and a generating unit configured to generate a setting file in which each of the plurality of types of parameters is described in a predetermined order according to the plurality of types of parameters received by the receiving unit.

8. The information processing apparatus according to claim 7, wherein the generating unit describes parameters among the plurality of types of parameters received by the receiving unit in decreasing order of the subordinate relationship in the setting file.

9. The information processing apparatus according to claim 7, wherein the generating unit does not describe a parameter which has no corresponding parameter having a higher order among the plurality of types of parameters received by the receiving unit in the setting file.

10. The information processing apparatus according to claim 7, wherein the sending unit sends the plurality of control signals based on content of the setting file according to an instruction input by the input unit.

11. The information processing apparatus according to claim 1, further comprising a display unit configured to display a setting screen for setting the plurality of types of parameters of the external apparatus,
wherein the instruction is input by the input unit via the setting screen.

12. A method for controlling an information processing apparatus that can communicate with an external apparatus, comprising:
inputting an instruction to change a parameter of the external apparatus;
sending, in a case where the instruction is an instruction to change a plurality of types of parameters of the external apparatus, a plurality of control signals for changing the plurality of types of parameters of the external apparatus to the external apparatus based on the plurality of types of the parameters to be changed; and
controlling, in a case where the instruction is an instruction to change the plurality of types of parameters of the external apparatus, a sending order of the plurality of control signals,
wherein, among the plurality of types of parameters which are in a subordinate relationship, controlling the sending order includes controlling to send a control signal for changing a parameter having a higher order in the subordinate relationship prior to a control signal for changing a parameter having a lower order in the subordinate relationship.

13. A non-transitory computer-readable medium storing a computer program for causing a computer to execute a method for controlling an information processing apparatus that can communicate with an external apparatus, the method comprising:
inputting an instruction to change a parameter of the external apparatus;
sending, in a case where the instruction is an instruction to change a plurality of types of parameters of the external apparatus, a plurality of control signals for changing the plurality of types of parameters of the external apparatus to the external apparatus based on the plurality of types of the parameters to be changed; and
controlling, in a case where the instruction is an instruction to change the plurality of types of parameters of the external apparatus, a sending order of the plurality of control signals,
wherein, among the plurality of types of parameters which are in a subordinate relationship, controlling the sending order includes controlling to send a control signal for changing a parameter having a higher order in the subordinate relationship prior to a control signal for changing a parameter having a lower order in the subordinate relationship.

14. The non-transitory computer-readable medium according to claim 13, wherein the external apparatus is an image capturing apparatus, and the plurality of types of parameters include a condition for image capturing performed by the image capturing apparatus.

15. The non-transitory computer-readable medium according to claim 14, wherein the condition includes parameters of a flash apparatus connected to the image capturing apparatus.

16. The non-transitory computer-readable medium according to claim 15, wherein, among the parameters of the flash apparatus, a parameter indicating ON and OFF of a flash function has a higher order in the subordinate relationship than a parameter indicating whether light control is performed manually.

17. The non-transitory computer-readable medium according to claim 15, wherein, among the parameters of the flash apparatus, a parameter indicating ON and OFF of a flash function has a higher order in the subordinate relationship than a parameter indicating ON and OFF of a wireless function.

18. The non-transitory computer-readable medium according to claim 13, the method further comprising:
receiving a plurality of types of parameters of the external apparatus from the external apparatus; and
generating a setting file in which each of the plurality of types of parameters is described in a predetermined order according to the plurality of types of received parameters.

19. The non-transitory computer-readable medium according to claim 18, wherein generating the setting file includes describing parameters among the plurality of types of received parameters in decreasing order of the subordinate relationship in the setting file.

20. The non-transitory computer-readable medium according to claim 13, the method further comprising displaying a setting screen for setting the plurality of types of parameters of the external apparatus, wherein the instruction is input via the setting screen.

* * * * *